July 14, 1959 W. A. ESCHENBURG 2,894,546
COMBINATION SAW, JOINTER AND SANDER TOOL
Filed Nov. 23, 1955 6 Sheets-Sheet 1

INVENTOR.
William A. Eschenburg,
BY
Cromwell, Greist & Warden

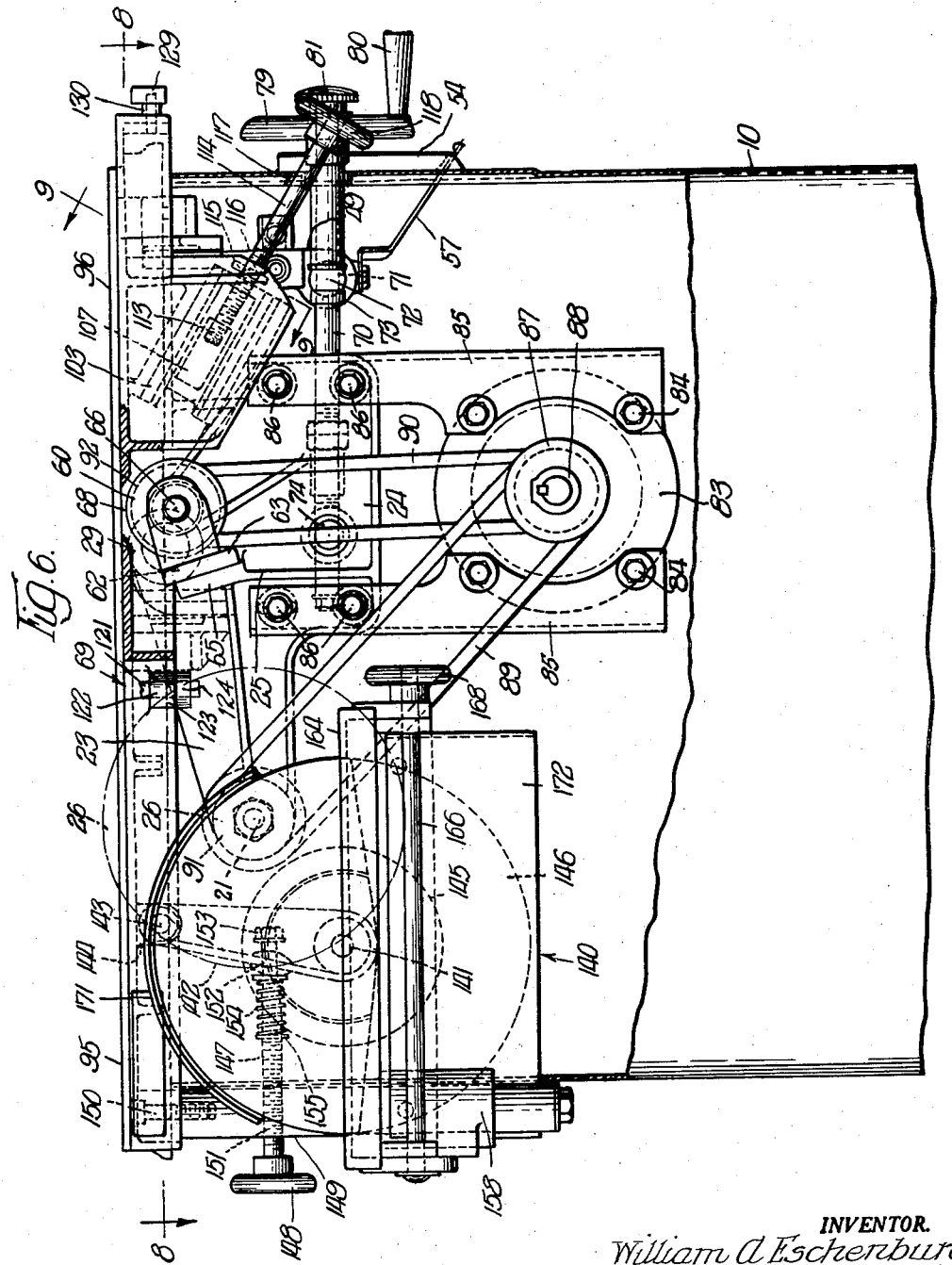

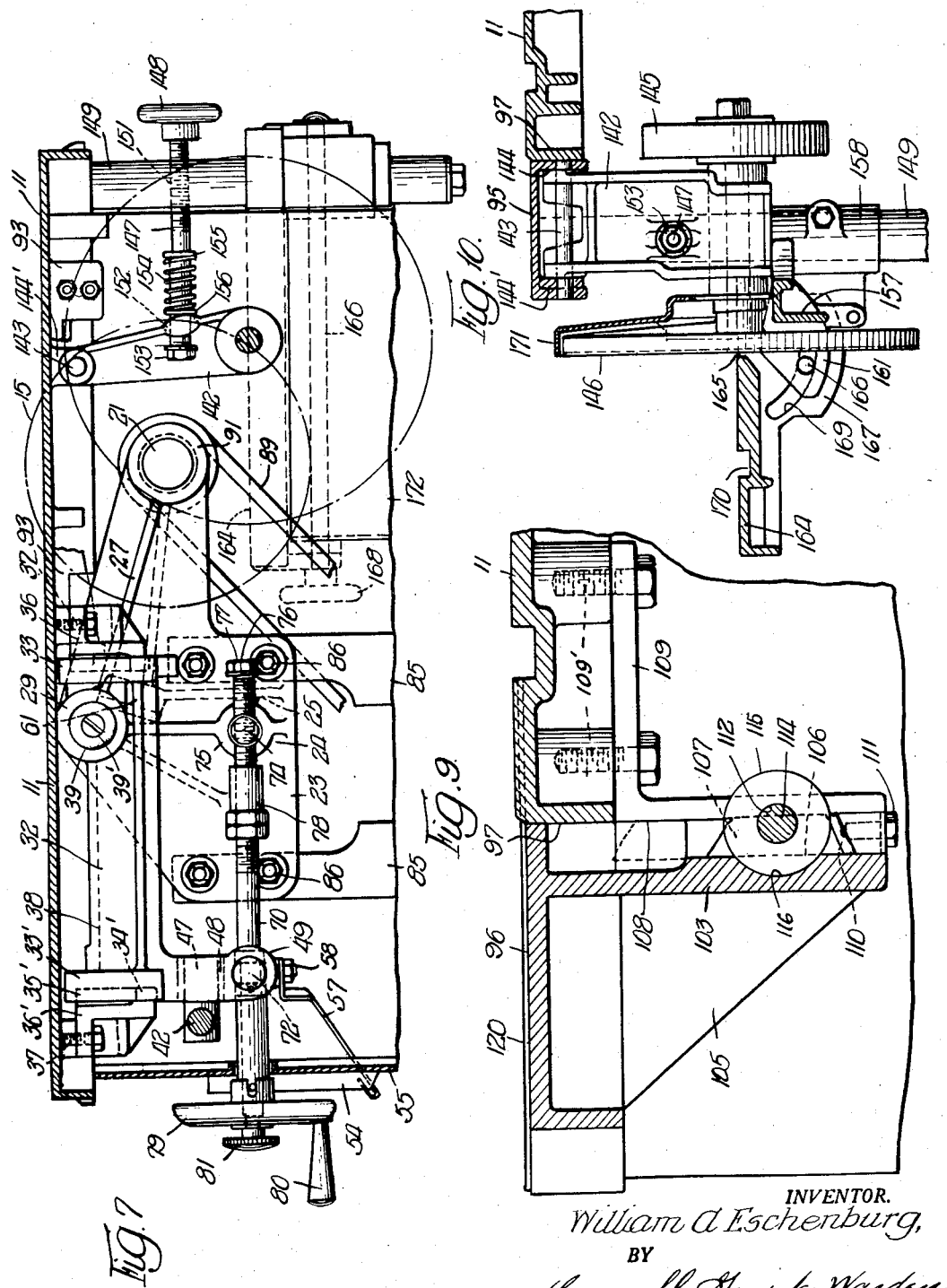

July 14, 1959 W. A. ESCHENBURG 2,894,546
COMBINATION SAW, JOINTER AND SANDER TOOL
Filed Nov. 23, 1955 6 Sheets-Sheet 6
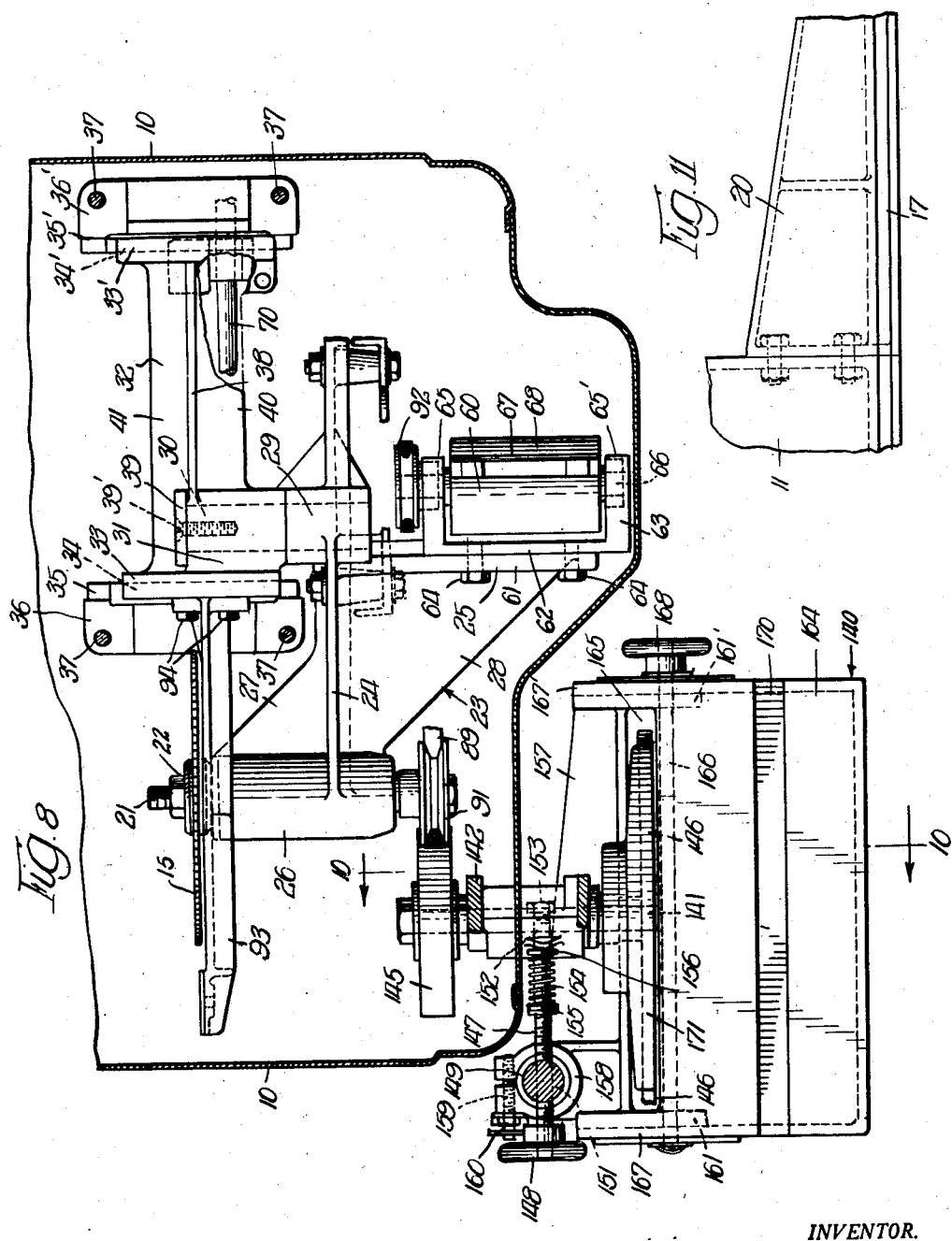
INVENTOR.
William A. Eschenburg,
BY
Cromwell, Greist + Warden
Attys.

United States Patent Office 2,894,546
Patented July 14, 1959

2,894,546

COMBINATION SAW, JOINTER, AND SANDER TOOL

William A. Eschenburg, South Beloit, Ill., assignor to Yates-American Machine Company, Beloit, Wis., a corporation of Delaware Application November 23, 1955, Serial No. 548,614

3 Claims. (Cl. 144—251)

This invention relates to power driven tools and is particularly concerned with improvements in a combination machine having a multiplicity of rotatable cutting members which are adapted for performing a variety of wood or metal working operations.

The improvements which constitute the present invention are disclosed in part but not claimed in a companion application by Archer Richards, Serial No. 550,509, filed concurrently herewith.

It is a general object of the invention to provide a combination machine having a multiplicity of power driven cutting elements which are movably mounted on a supporting frame structure which includes a cooperating work supporting top, the cutting elements being arranged so that they may be selectively positioned with a minimum of adjustment in operative relation to the work supporting top whereby the machine is capable of performing in an efficient manner a variety of cutting operations on wood, metal or similar materials without time consuming change-over or set-up operations.

It is a more specific object of the invention to provide in a combination machine having a multiplicity of power driven tools for cutting wood, metal or similar material wherein the tools are driven from a single motor or other prime mover and wherein the tools are mounted so that they may be quickly adjusted by the operator to selectively position the same in operative relation to a work supporting surface on the machine and wherein the work supporting surface is specially constructed so that each of the tools may be operated without interference from any of the others.

It is a further object of the invention to provide a combination tool wherein a pair of cutting tools are associated beneath a work supporting member which work supporting member has adjoining portions forming work surfaces which are at different elevations and which are provided with work slots for the tools, and wherein the tool slot in the lowermost work surface is provided with a removable cover member which does not extend above the adjoining work surface.

It is a still further object of the invention to provide a combination tool wherein a jointer head and a saw arbor are movably supported beneath a work table and the work table is provided with adjoining work supporting surfaces at different elevations and with tool slots in such surfaces for receiving the respective tools, and wherein a removable cover plate is provided for the tool slot in the lowermost surface, which cover plate, when it is positioned over the tool slot, does not project into the path of work pieces moved across the adjoining work surface.

These and other objects and advantages of the invention will be apparent from a consideration of the machine which is shown by way of illustration in the accompanying drawings wherein:

Fig. 6 is a side elevation of the top portion of the machine with portions broken away;

Fig. 7 is a partial cross section on the line 7—7 of Fig. 3;

Fig. 8 is a partial cross section on the line 8—8 of Fig. 6, with portions broken away;

Fig. 9 (Sheet 5) is a partial cross section on the line 9—9 of Fig. 6 to an enlarged scale;

Fig. 10 is a partial cross section on the line 10—10 of Fig. 8; and

Fig. 11 is a fragmentary plan view of a front table extension arm.

Figure 1:
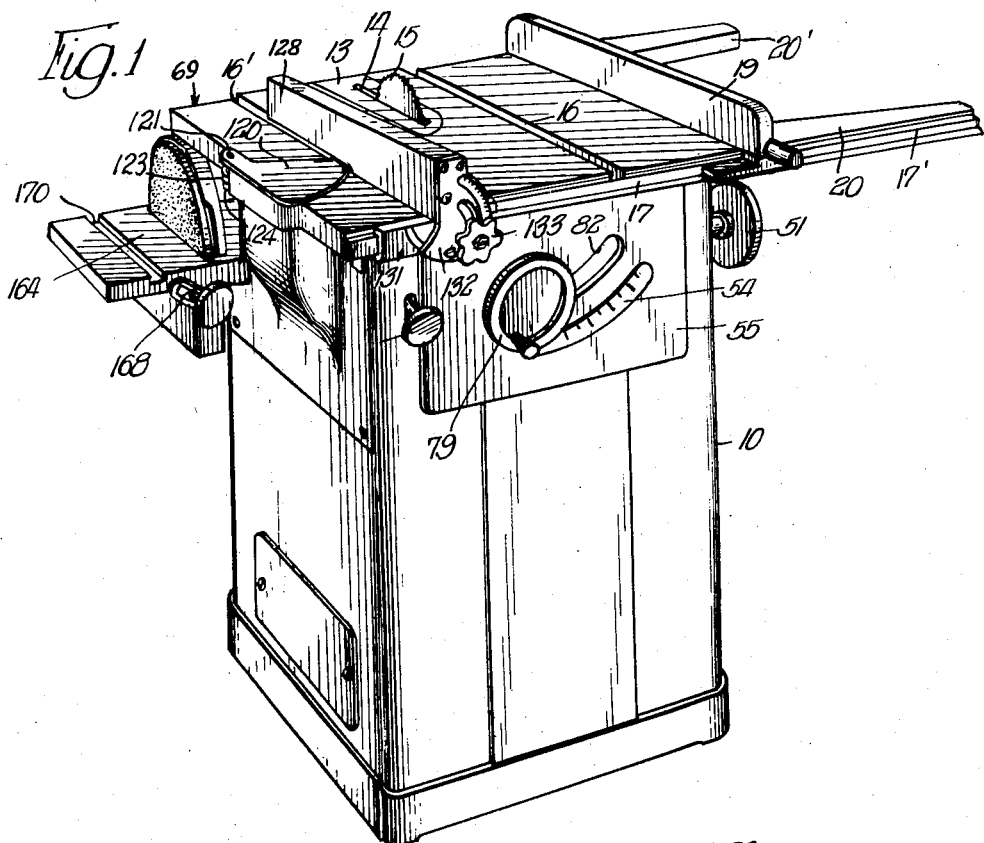
Fig. 1 is a perspective view of a combination machine having incorporated therein the principal features of the invention, with the view taken from the front of the machine.
Figure 2:
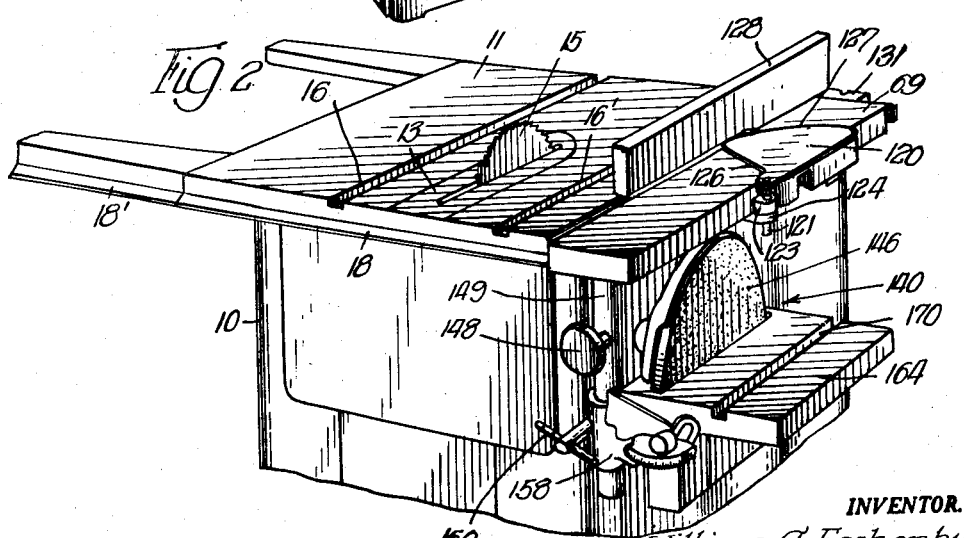
Fig. 2 is a partial perspective view of the top of the machine shown in Fig. 1 with the view taken from the back of the machine.

Referring to the drawings, there is illustrated a combination machine or convertible tool which embodies the principal features of the invention and which is adapted to perform various cutting operations on wood or similar materials, such as, sawing, joining and sanding the same, the tool being illustrated in Figs. 1 to 7 with a saw blade in operative position in a tool slot in the surface of the work table which forms the top surface thereof.

The illustrated machine comprises an upright supporting frame in the form of a closed or partially closed cabinet 10 which is employed as a base for supporting the movable elements of the machine in all the positions in which they are adjusted to adapt the same for various operations. The supporting frame 10 is provided with a fixed top 11 which serves as a work receiving and supporting table over which the work pieces may be moved for the sawing and joining operations. The table 11 is generally rectangular in shape with a transversely extending saw blade receiving aperture 12 intermediate its side edges having a removable insert or cover plate 13 which is slotted at 14 to receive the saw blade 15, the latter being mounted on elevating and tilting mechanism which will be described. The insert 13 may, of course, be removably held in the aperture 12 by any conventional fastening means. The table 11 is also provided with front to rear extending parallel grooves 16, 16' for receiving a cross cutting miter gauge (not shown), which grooves extend parallel to the plane of the blade 15 when the latter is in normal vertical cutting position, and which are spaced on opposite sides of the aperture 12. The front and rear edges of the table 11 are provided with supporting and guiding rail formations 17 and 18, respectively, for receiving in supporting relation the ends of a suitable guide fence 19, the latter being provided with mechanism for locking it to the rails, which forms no part of the present invention. The one side edge of the table 11 may also have attached thereto by bolts or the like, arms 20 and 20' which provide top surfaces each in the form of a trapezoid with the front and rear edges of the arms being aligned with the front and rear edges of the table when mounted thereon and including extensions 17' and 18' of the fence suporting and guiding rail formations 17 and 18. At the opposite side edge the table 11 is provided with marginal portions which form the working surface for a jointer and which will be subsequently described in detail.

The saw blade 15 is secured on the threaded end of a relatively short shaft or arbor 21 by means of conventional clamping nuts and washers, indicated at 22, with the arbor 21 being supported in vertically adjustable and laterally tiltable relation to the table surface 11 by a supporting bracket 23 which is mounted beneath the table 11. The bracket 23 consists of a casting of generally T-shape with a web or plate-like head forming member 24 and a web or plate-like stem forming member 25, see Fig. 8. The plate-like web 24 which forms the head portion of the T is normally positioned in a vertical plane extending transversely of the work table or surface 11 from the front to rear edges of the latter when the saw blade 15 is adjusted for normal sawing operations. The web plate 24 is generally triangular in shape (Figs. 6 to 8) and is provided at one corner with a laterally extending bearing support 26 in which the saw arbor 21 is journalled with suitable bearings (not shown) being provided therein, preferably of the sealed, self-lubricating type. The bearing support 26 projects laterally at right angles to the plane of the web plate 24 on both sides thereof (Fig. 8) and is braced by means of connecting webs 27 and 28 which extend horizontally between the bearing support 26, the head forming web plate 24 and the stem forming web plate 25 of the T-shaped bracket 23, the reinforcing webs 27 and 28 being in planes approximately at right angles to the plane of the web plate 24. The bracket 23 is provided with an apertured boss 29 which extends laterally on opposite faces of the web plate 24, at a point adjacent the top edge of the vertical web plate 24 and spaced a substantial distance from the saw arbor support 26, and which receives in fixed relation therein one end of a pivot pin 30, the latter being secured in the aperture in any conventional manner. The other end of the pivot pin 30 is journalled in an aligned bearing aperture in a boss 31 which is formed on a trunnion member 32. The axis of the pivot pin 30 is parallel to the axis of the saw arbor 21 and extends in a plane normal to the plane of the vertical web plate 24 and parallel to the plane of the web plate 25 so that the bracket 23 pivots on the pin 30 to raise and lower the saw arbor 21 relative to the work table 11.

The trunnion member 32 (Figs. 3, 5 to 8) comprises an elongate casting which extends beneath the work table 11 from a point adjacent the front edge of the latter to a point near the front of the saw slot 12 and is provided at its opposite ends with quadrant shaped end or head portions 33, 33' which extend transversely of the long axis of the trunnion and which have on their end faces track forming recesses 34, 34'. The guideway forming recesses 34, 34' are adapted to receive cooperating rail forming members 35, 35' which project toward each other from trunnion hangers or support brackets 36, 36', the latter being secured by bolts 37 in depending relation on the bottom face of the table 11 and outboard of the ends or head portions 33, 33' of the trunnion 32, whereby the trunnion member 32 is adapted to be moved in a circular path about the center of curvature of the guideways 34, 34' and the cooperating guide rails 35, 35'. The boss 31 in which the pivot pin 30 is journalled extends laterally of the long axis of the trunnion member 32 at the rear end thereof and normal to the vertical web 38 which forms the main body portion of the trunnion and the pivot pin 30 is secured in rotatable relation therein by a suitable end collar or cap 39 and screw 39'. The trunnion web 38 is provided with oppositely directed upper and lower side reinforcing flanges 40 and 41, the latter extending the full length of the former between the head portions 33, 33' and the former extending from the projecting boss 31 to the head portion 33'.

The swinging or tilting movement of the trunnion 32 on its supporting rails 35, 35' is controlled by a rotatable screw 42 (Figs. 4 and 5) which is rotatably mounted in a bore in one end of a supporting pivot 43 which has its other end journalled in an apertured boss 44 in the lower end of a bracket 45 which is secured by bolts 46 in depending relation on the bottom face of the table 11 at one side thereof. The threaded inner end of the adjusting or tilting screw 42 engages in a threaded aperture in one end of a pivot nut or block 47 which has its other end journalled in a bearing forming member 48 on a depending portion 49 of the trunnion 32. The tilting screw 42 is provided with an adjustable stop collar 50 to limit the extent of the tilting movement of the trunnion 32 and at its outer end carries an operating wheel 51 with a handle member 52 together with a suitable locking mechanism having an operating knob indicated at 53. Rotation of the adjusting screw 42 in one direction, of course, swings or tilts the trunnion 32, relative to its supporting brackets, 36, 36' and also tilts the saw arbor supporting bracket 23 which is connected thereto by the pivot 30, in the same manner, so that when the blade 15 on the arbor 21 is in normal operating position in the work slot 14 it may be adjusted to position it for cutting in a plane at an angle to the work surface of the table 11.

The angle at which the trunnion 32 and the saw blade 15 or arbor 21 is tilted is indicated on a graduated segmental scale 54 (Figs. 4 to 7) mounted on a removable front plate 55 on the supporting base structure 10. The scale 54 is mounted adjacent a segmental slot 56 in the plate 55 which accommodates the free end of a pointer blade 57 which extends from and has its other end attached, by screw 58, to the bottom of the depending bracket portion 49 of trunnion 32.

In addition to the saw arbor 21, the bracket 23 carries on the upper edge of the web plate 25 which forms the stem of the T-shaped bracket 23 a jointer head 60. The web plate 25 is provided at its upper edge with a thickened base forming portion 61 on which is mounted the base member or bearing plate 62 of a generally U-shaped supporting frame 63 for the jointer head 60. The plane of the face of the web portions 61 which supports the jointer head 60 extends parallel to a plane extending through the axis of the pivot pin 30 which is the axis of rotation of the bracket 23. The plane of this supporting surface is also normal to a plane extending through the axis of the pivot pin 30 and the saw arbor 21. The head supporting portion 61 is offset somewhat below the pivot pin 30 and spaced therefrom a short distance in the direction of the saw arbor 21. The U-shaped jointer head supporting frame 63 has its base or bearing plate 62 secured to the base support 61 by bolts 64 or other suitable fastening means which will permit ready removal for repair or replacement. The leg forming portions 65, 65' of the jointer head frame 63 are laterally spaced and provided with aligned bearings of a suitable character for receiving the jointer head shaft 66, the latter carrying the usual arrangement of cutting blades 67 and cylindrical support member 68 therefor. The jointer head 60 and the platform support or base 61 for the same at the upper edge of the web plate 25 are so arranged relative to the axis of the pivot 30 and the axis of the saw arbor shaft 21 that rotational or tilting movement of the bracket 23 about the pivot pin 30 in a direction to raise the saw arbor 21 a sufficient distance to bring the saw blade 15 into operative relation in the slot 14 in the table 11 causes the jointer head 60 to be rotated about the axis of the pivot pin 30 to lower the cutting blades 67 beneath the work slot 68 which is provided for the same in the jointer table 69 (Fig. 3) which is arranged at one side of the table 11 and constitutes a continuation or extension of the latter. Reverse movement of the bracket 23 about its pivot pin 30 lowers the saw arbor 21 to bring the saw blade 15 beneath the surface of the table 11 and at the same time tilts the jointer head 60 to raise the cutting blades 67 into operative position in the slot 68 in the jointer table 69.

Figure 3:
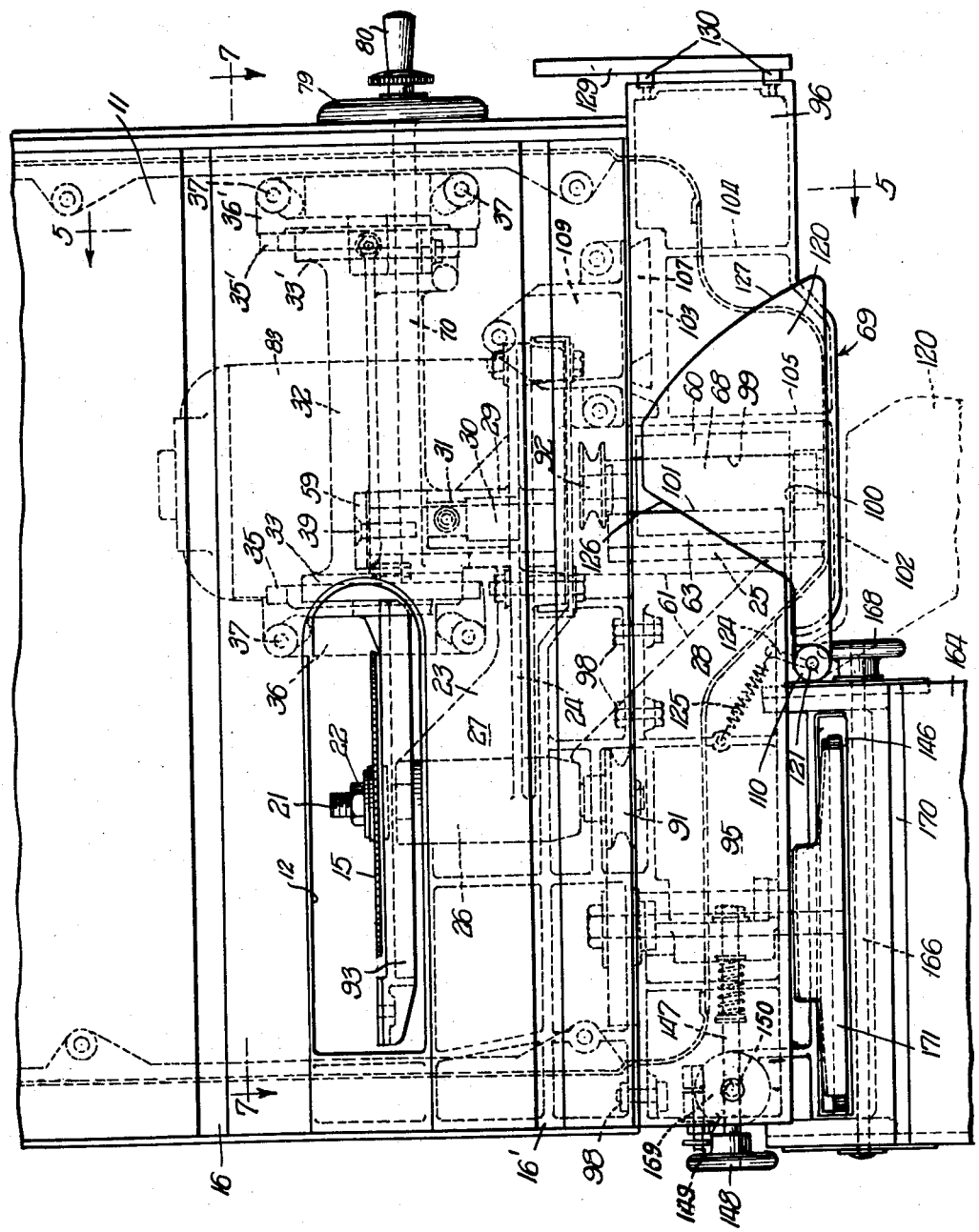
Fig. 3 is a partial, plan view, to a larger scale, showing a portion of the top of the machine.

The swinging or tilting movement of the arbor supporting bracket 23, about its pivot 30, which is required to position the saw blade 15 into and out of operative relation with the work supporting surface of the table 11, is controlled by the tilting and adjusting screw 70 (Figs. 3, 6 and 7). The screw 70 is rotatably supported in a bore 71 in one end of a supporting pivot 72 which has its other end journalled in a bearing member 73 provided at the lower end of the depending portion 49 of the trunnion member 32. The threaded inner end of the adjusting or tilting screw 70 engages in a threaded aperture in one end of a pivot nut or block 74 which has its other end rotatably mounted in an apertured boss 75 which projects inwardly of the web plate 24 of the bracket 23 at a substantial distance below the pivot pin 30 and adjacent the bottom edge of the web plate 24. The tilting or elevating screw 70 is provided on its inner end with a stop washer 76 held thereon by a stud bolt 77 and at a point intermediate the ends thereof a stop collar 78 is secured thereon to limit the movement of the screw 70 relative to its pivoted nut connection with the bracket 23. At the outer end the screw 70 carries an operating knob or wheel 79 with a handle member 80 and a suitable locking mechanism is provided therewith having an operating knob indicated at 81. The elevating screw 70 extends through an arcuate slot 82 (Fig. 4) in the removable plate 55 on the front face of the supporting cabinet 10 which permits movement of the screw 70 when the trunnion 32 is adjusted by the tilting screw 42. The operating wheel 79 is suitably marked to indicate the proper direction of rotation for elevating the saw blade 15 or the jointer head 60, as desired.

The bracket 23 carries in addition to the saw arbor 21 and the jointer head a single operating or drive mechanism for both of these members. A drive motor of suitable size 83 (Figs. 3 and 5) is secured at its one end by bolts 84 to a pair of hanger plates 85 which are bolted at 86 to the main web plate 24 of the bracket 23. The drive motor 83 is provided with a double pulley 87 on the end of its shaft 88 which is connected by drive belts 89 and 90 (Fig. 6) to pulleys 91 and 92 on the saw arbor 21 and the jointer shaft 66, respectively. The motor 83 extends beneath the bracket 23 and the trunnion member 32 and is positioned so that its weight is balanced about the pivot 30 and also about the axis of rotation of the trunnion 32.

The trunnion 32 is provided at the end adjacent the saw arbor with a blade guard member 93 (Figs. 3 and 8) which is secured thereto by bolts 94 or other fastening means and extends along the arbor side of the saw blade 15. The guard 93 is tilted with the saw blade 15 when the trunnion 32 and the bracket 23 are adjusted or moved to tilt the saw arbor 21 for arranging the blade 15 at an angle to the working surface of the table 11.

The jointer table 69 which provides a work supporting surface for jointer operations comprises a fixed table member 95 and a movable table member 96 (Fig. 6), both of which are supported along one side and constitute lateral extensions of the table 11. The table member 95 which constitutes the fixed section of the jointer table 69 is generally rectangular in shape and is secured to the rear portion of the depending side flange 97 (Fig. 10) on the table 11 by bolts 98 (Fig. 3) or other suitable fastening means, with the surface thereof being somewhat below the surface of the saw table 11. The table member 96 which constitutes the movable section of the jointer table 69 is adjustably mounted at the forward end of the depending flange 97 (Fig. 5) on the table 11. It is generally rectangular in shape with a rectangular recess cut in the rear portion, the edges of which form the movable front edge 99 and the side edge 100 (Fig. 3) of the work slot 68, the fixed rear edge 101 being formed by the front edge of the fixed table member 95 of the jointer table and the inner side edge being formed by a portion of flange 97 of the saw table 11. The rearwardly extending outer side portion 102 on the movable table member 96 covers the outer end of the jointer head 60.

The front table member 96 (Figs. 3, 5, 6 and 9) is provided with a slide or guideway forming bracket portion 103 which depends from the bottom surface along the inner edge thereof and which is braced to the outer edge by generally triangular transversely extending reinforcing webs 104 and 105. The bracket portion 103 is provided with a dovetail groove or recess 106 extending downwardly and forwardly at an angle or approximately 30° from the top or work surface of the member 96. The dovetail groove 106 is adapted to receive a guide rail 107 of complementary cross section which is provided on the outer vertical face 108 of an angular bracket 109. The angular bracket 109 is secured in depending relation on the bottom face of the table 11 beneath the edge flange 97 thereof by bolts 109' or other fastening means. A gib 110 which is in the form of a flat strip of rectangular cross section is employed to hold the guide rail 107 in the groove 106, the latter being of larger cross section than the rail to permit disassembly of the adjusting mechanism. The gib 110 is held in position in the dovetail groove 106 by set screws 111. The guide rail 107 is provided with a threaded bore 112 extending in the direction of its longitudinal axis which receives the threaded end 113 of an adjusting or raising and lowering screw 114. The screw 114 has a collar 115 secured thereon which is operative in a recess 116 extending laterally in the bottom or outer wall of the dovetail groove 106 in the bracket portion 103 of the table member 96, the assembly of the screw 114 with the collar 115 thereon in the groove 106 so that collar 115 is seated in the recess 116 being possible by reason of the clearance provided between the groove 106 and rail 107 for the gib 110. The adjusting screw 114 extends through a slot 117 in the front wall of the housing 10 and is provided with a knob 118 at the outer end thereof for rotating the same. Rotation of the screw 114, of course, results in raising and lowering the table member 96 relative to the fixed table 95 with the guide rail 107 operating in the dovetail groove 106, and thus controls the depth of cut when the jointer head 60 is properly positioned in its work slot 68.

A guard or cover plate 120 is provided for the tool slot 68 which is of generally triangular shape and which has a depending pivot pin 121 at an outer corner thereof for mounting in rotatable and vertically slidable relation in a bearing socket 122 (Fig. 6) provided in a laterally extending boss 123 (Figs. 2, 3 and 6) on the fixed table member 95. The pivot pin 121 has secured at its lower end the one end of a relatively small arm 124 which extends laterally normal to the axis of the pin 121 and is connected at its outer end to one end of a tension spring 125, the other end of the latter being anchored to a convenient portion of the fixed table member 95. The inner or rear edge 126 of the guard plate 120 is shaped complementary to the outer edge of the portion 102 of table member 96 so that it may be engaged with the same when it is pivoted outwardly a sufficient distance to clear the movable table member 96 and the pin 121 is depressed in its socket 122 thereby permitting the guard plate 120 to be held in an out of the way position below the surface of the work table 69 when desired, without removing the same from the machine. The tension in the spring 125 otherwise holds the guard plate 120 in covering relation over the tool slot 68 on the top surface of the table members 95 and 96 with its inner edge engaging the edge of the saw table 11. The thickness of the guard plate 120 is slightly less than the difference in the elevation of the surfaces of the saw table 11 and jointer table member 95 so that when it is resting on the table member 95 it does not project above the top surface of table 11 and does not interfere with the movement of work across the saw table 11 when it is in use and the jointer is out of use. The forward edge 127 (Figs. 2 and 3) of the guard plate 120 is curved to permit a work piece to be inserted between the same and the work guide or fence 128 which is provided for use on the table 69. The guide fence 128 is of well known construction and the table member 96 is provided with a rail 129 (Fig. 3) secured along the forward edge thereof by suitable bolts and spacers 130 for receiving the supporting end bracket 131 on the guide fence 128, the latter being provided with conventional adjusting mechanism 132 and a locking member 133 for adjusting the guide fence 128 either laterally of the table 69 or in tilting relation to the same.

The tool is provided at the rear of the side edge on which the jointer table 69 is mounted with a sanding mechanism indicated at 140 (Figs. 3, 6, 7, 8, and 10). The sanding mechanism 140 comprises a work shaft 141 (Fig. 6) which is journalled in the bottom end of a depending arm 142 which arm 142 is mounted for pivotal or swinging movement about the axis of a supporting pin or shaft 143. The supporting pin 143 extends between a pair of bearing forming bosses 144, 144' which are in depending laterally spaced relation on the bottom surface of the fixed jointer table member 95 near the rear end thereof. The work shaft 141 carries on its inner end a friction wheel 145 which is adapted to be moved into and out of engagement with the belt drive 89 adjacent the pulley 91 on the saw arbor 21, the work shaft 141 and the friction wheel 145 being so proportioned and positioned relative to the bracket 23 that in the normal vertical position of the bracket 23, which places the saw blade 15 in operative position relative to work table 11, the friction wheel 145 will be aligned with or in the same plane with the drive belt 89 and pulley 91. At its other end the work shaft 141 is provided with a removable sanding plate or disk 146 which may be secured on the end of the shaft 141 by a set screw or in any conventional manner.

The angular position of the swinging arm 142 which supports the work arbor 141 is adjusted by means of an adjusting screw 147 which extends generally horizontally towards the rear of the main frame 10 and is provided with an operating knob or handle 148. The adjusting screw 147 is supported on a hanger shaft or post 149 which is secured in depending relation from the bottom surface of the jointer table member 95 by means of a stud bolt 150. The post or hanger 149 is provided with a threaded aperture 151 which receives a threaded section of the adjusting screw 147. At its other end the adjusting screw 147 is pivotally attached to the swinging arm 142. Its inner end extends through a bearing slot 152 in the wall of the arm 142, the latter having a channel-shaped cross section, and is provided on its end with a stop nut 153. A compression spring 154 is mounted on the screw 147 with one end fixed thereon by a stop washer 155 and the other end provided with a slidable washer 156 which bears against an embossed portion of the wall of the arm 142 around the slot 152, the tension in the spring 154 tending to urge the arm 142 about its pivot 143 to bring the frictional wheel 145 into operative engagement with the drive belt 89 so that when the screw 147 is adjusted properly the wheel 145 will be held against the belt 89 by the tension in the spring 154 during operation of the work shaft 141. The stop nut 153 on the end of the screw 147 engages the arm 142 around the slot 152 upon reverse rotation of the screw 147 and swings the arm 142 in a clockwise direction towards the rear of the machine to disengage the friction drive wheel 145 and the drive belt 89.

A trunnion table support member 157 (Fig. 10) for the sanding mechanism is slidably and rotatably secured at its rear end on the depending support post or shaft 149. The trunnion 157 has a rearwardly extending bearing and clamp formation which comprises a split sleeve member 158 and a cooperating clamp bolt 159 (Fig. 8) for securing the same in position on the depending hanger 149 with the clamp bolt 159 having an operating handle member 160 on its rearwardly extending end. The trunnion 157 is positioned on the inner side of the sanding disk member 146 and is provided with longitudinally spaced laterally extending bearing arms or ears 161, 161', which extend on the outer side of the sanding disk 146, and which provide supports for a tiltable work supporting table 164. The trunnion member 157 is arranged to the rear or along the inner face of the sanding disk 146 and the table 164 is arranged outboard of the disk 146 with opposed edges of the two members forming a work slot 165 in which the sanding disk 146 is operative. A supporting and clamping rod or shaft 166 for the work table 164 extends through bearing ears or end flanges 167, 167' on the table 164 and the bearing arms 161, 161' on the trunnion support 160 and is provided at one end with a locking arrangement having a knob 168. The end supporting flanges 167, 167' for the table 164 are provided with arcuate slots 169 (Fig. 10) to permit the table 164 to tilt on the supporting shaft 166 to position the work suppoting surface thereof in angular relation to the vertical working plane of the sanding disk 146. The top surface of the table is provided with a miter gauge receiving recess or groove 170. A dust guard 171 is positioned adjacent the rear face of the sanding disk 146 and secured to the depending arm 142 to swing therewith. A duct chute 172 (Figs. 6 and 7) is secured to the trunnion 157 and extends below the work slot 165 in the table 164 to receive the sawdust from the sanding disk 146 when it is in operation.

Figure 4:
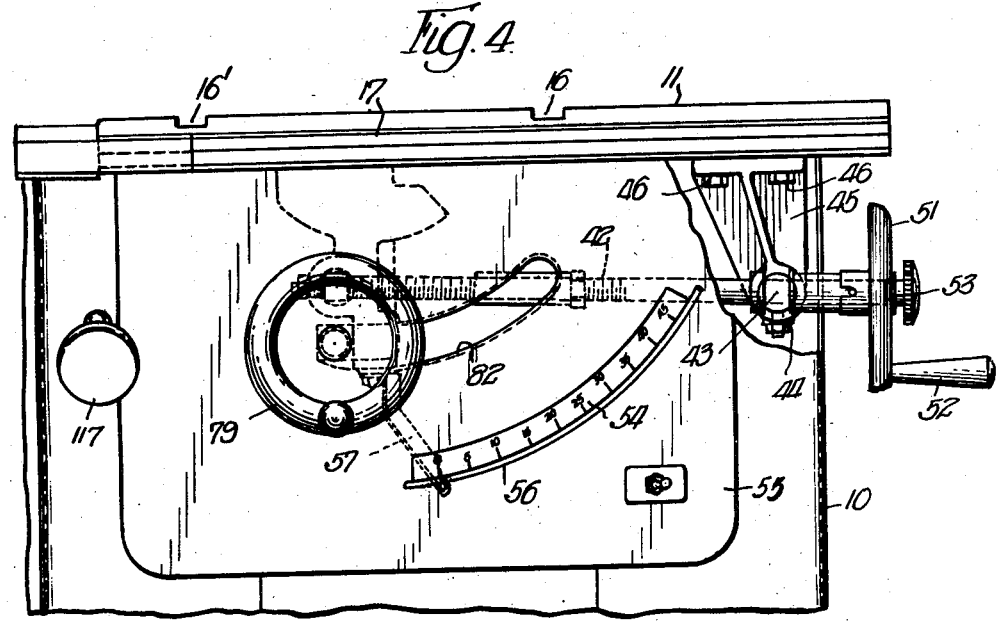
Fig. 4 is a partial front elevation, to a larger scale, of the top portion of the machine with portions broken away.
Figure 5:
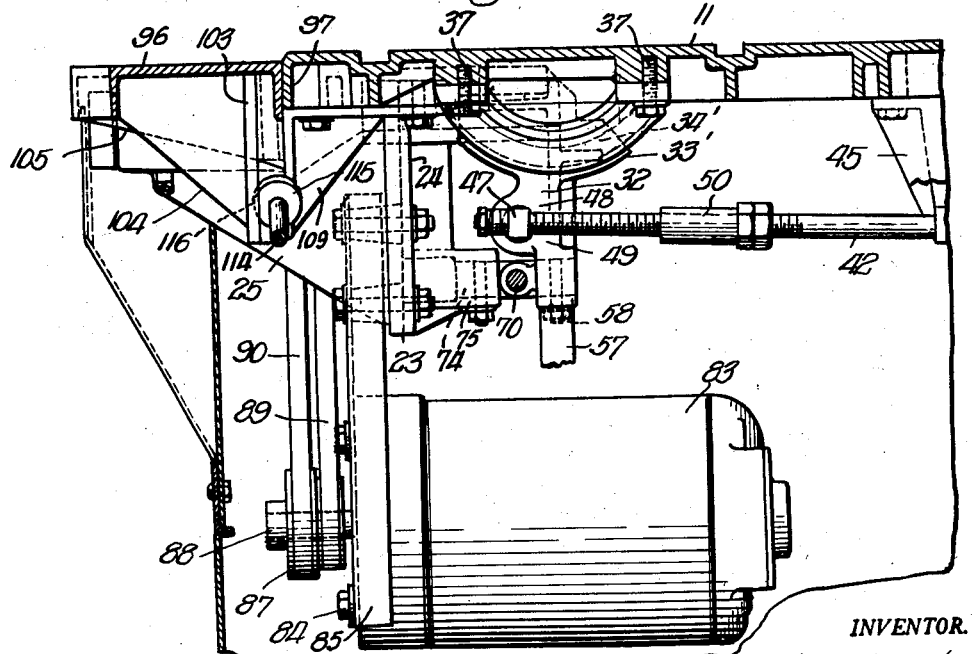
Fig. 5 is a partial section taken on the line 5—5 of Fig. 3.

The tool may be readily adjusted for use by operation of the adjusting screws. When it is desired to use the saw the tilting or adjusting screw 70 is rotated as indicated on the operating wheel 79 to rotate the bracket 23 about its pivot 30 to position the saw blade 15 in the saw slot 14 as shown in Figs. 1, 2, 3 and 6. The trunnion 32 will normally be positioned so that the blade 15 is in a vertical plane as in Figs. 1 to 5. When it is desired to tilt the blade 15 for a bevel cut, the tilting screw 42 may be rotated to position the blade 15 at the desired angle to the work surface of the table 11, the angle being indicated on the scale 54 (Fig. 4). Normally, the jointer fence 128 will be removed from the table 69 during use of the saw and the cover plate 120 will be positioned over the jointer slot 68 to insure that no contact can be had with the jointer head 60, the latter being driven continuously by the motor 83, simultaneously with the saw arbor 21. The cover plate 120 does not extend above the surface of the table 11 and, of course, does not interfere with the movement of work pieces across the table 11 during sawing operations.

When it is desired to use the jointer 60 the tool supporting bracket member 23 is adjusted, by operation of the tilting screw 70, to swing the jointer head 60 into operative position in the slot 68, the trunnion 32 being in its normal vertical position, that is, in the position in which the saw blade 15 is in a vertical plane normal to the surface of the table 11. With the jointer head 60 properly positioned in the work slot 68, the front section 96 of the jointer table 69 is adjusted or lowered by rotation of screw 114 to provide the desired depth of cut. The fence 128 will be positioned as desired on the table 69 and properly secured by operation of its front end clamp. The cover plate 120 may be allowed to remain as in Fig. 1 and the work passed between the curved front edge 127 and the fence 128 or it may be swung on its pivot 121 against the tension of the spring 125 and the pivot 121 depressed to position the plate 120 in an out of the way position below the surface of the table 69 as indicated in dotted line in Fig. 3 where its forward edge 126 will engage the outer edge of the forward portion 102 of the table section 96.

The sanding mechanism 140 may be placed in operation when the saw is operating in its normal vertical position by rotating the adjusting screw 147 to swing the bracket 142 toward the bracket 23 a sufficient distance to bring the friction drive wheel 145 on the inner end of the sanding arbor 141 into engagement with the drive belt 89 as it traverses the pulley 91 on the outer end of the saw arbor 21. The sanding arbor 141 may be adjusted by proper rotation of adjusting screw 147 for operation when the bracket 23 is swung to position the jointer head 60 in its work slot 68. The rotation of the sanding arbor 141 may be discontinued at any time by proper rotation of the adjusting screw 147. The sanding plate 146 may be removed from the arbor 141 and any other suitable shaft driven tool secured thereon such as a flexible shaft, grinding wheel, sanding drum or the like. The table 64 and its associated members may, of course, be readily removed from the supporting post 149 at any time to facilitate use of this mechanism.

While specific materials and particular details of construction have been referred to in describing the illustrated form of the tool, other mateials and other details of contruction may be resorted to within the spirit of the invention.

I claim:

1. In a power driven combination tool having an upright supporting frame and a work table provided with adjoining portions which are at different elevations, individual tool accommodating slots in said table portions, a bracket pivotally mounted on said frame and a pair of tool carrying members rotatably mounted on said bracket, said tool carrying members being mounted for rotation about axes which are spaced from each other and from the pivotal mounting for said bracket whereby when said bracket is swung in one direction about its pivotal mounting the tool on one of said tool carrying members is moved into operative position in one of said tool slots and when said bracket is swung in the opposite direction about its pivotal mounting the tool on the other of said tool carrying members is moved into operative position in another of said tool slots, and a relatively thin plate-like cover member for the tool slot in the portion of the table which is at the lower elevation, said cover member having a mounting pivot, and a socket for said pivot at the edge of said table which socket is below the surface of said table whereby said cover member may be swung on its pivot from a position resting on said table to a lateral position clear of said table and depressed below the plane of the surface of said table for unobstructed movement of the work across said table.

2. In a power driven tool having an upright supporting frame and a horizontal work table having adjoining laterally spaced portions thereof forming work supporting surfaces at different elevations, laterally spaced tool slots in the portions of said table which are at different elevations, a movable tool supporting structure beneath said table, tool blades rotatably mounted in spaced relation on said supporting structure, said tool supporting structure being movable to selectively position the tool blades in operative work engaging relation in the respective tool slots, and a relatively thin plate-like laterally swingable tool slot cover member mounted on the portion of said table which is at the lower elevation, said cover member having a thickness which is no greater than the difference in elevation of said table portions, a depending pin on an outer corner portion of said cover member, a boss on the outer edge of said table portion which is at the lower elevation having a vertical socket for said pin, the upper face of said boss being below the adjoining surface of said table portion whereby said cover member may be swung outwardly on its pin and depressed below said table surface to permit unobstructed movement of work across said table surfaces, and spring means connected to said pin and said table to normally urge the cover member into operative position over the tool slot.

3. In a power driven tool having an upright supporting frame and a work table having adjoining portions which form work supporting surfaces at different elevations, the work table portion which is at the higher elevation being of substantial width and the adjoining table portion which is at the lower elevation being relatively narrow and extending along one side edge thereof, tool slots in said table portions, a tool supporting structure movably mounted beneath said table, tool blades rotatably mounted in spaced relation on said supporting structure, said tool supporting structure being movable to selectively position the tool blades in operative work engaging relation in the respective tool slots, and a removable cover member swingably mounted on the narrow portion of said table, said cover member having a thickness which is no greater than the difference in elevation of said table portions and a width approximating that of the narrow table portion, said cover member being mounted on a vertical pivot which is spaced outwardly of the outside edge of said narrow table portion for swinging movement in a horizontal path across the tool slot in said narrow table portion so that in its normal position it covers the tool slot and does not project above the adjoining portion and for vertical movement below the table portion when swung beyond the edge of the table to expose the tool slot.

References Cited in the file of this patent

UNITED STATES PATENTS

| | | |
|---|---|---|
| 315,687 | Whiting | Apr. 14, 1885 |
| 970,917 | Getz | Sept. 20, 1910 |
| 1,066,730 | Hughes | July 8, 1913 |
| 1,132,327 | Frush | Mar. 16, 1915 |
| 1,621,999 | Pierce | Mar. 22, 1927 |
| 1,715,564 | Patterson | June 4, 1929 |
| 1,788,663 | De May | Jan. 13, 1931 |
| 1,829,827 | Garbarino | Nov. 3, 1931 |
| 2,045,853 | Hartz | June 30, 1936 |
| 2,075,282 | Hedgpeth | Mar. 30, 1937 |
| 2,102,857 | Schafer | Dec. 21, 1937 |
| 2,342,459 | Dushans | Feb. 22, 1944 |
| 2,581,475 | Fenner | Jan. 8, 1952 |
| 2,619,997 | Gaskell | Dec. 2, 1952 |
| 2,697,458 | Cue | Dec. 21, 1954 |
| 2,748,812 | Nelson | June 5, 1956 |

FOREIGN PATENTS

| | | |
|---|---|---|
| 917,745 | Germany | Sept. 9, 1954 |